United States Patent [19]

Hammer et al.

[11] 3,890,530
[45] July 17, 1975

[54] PRECOAT FOR FLUORESCENT LAMP

[75] Inventors: Edward E. Hammer, Mayfield Village; William C. Martyny, Lyndhurst, both of Ohio

[73] Assignee: General Electric Company, Schenectady, N.Y.

[22] Filed: Jan. 22, 1973

[21] Appl. No.: 325,430

[52] U.S. Cl. .............................................. 313/489
[51] Int. Cl. ............................................. H01j 61/35
[58] Field of Search .... 313/109, 489; 117/69, 70 A, 117/123 A, 123 B, 124 A, 124 B, 124 T

[56] References Cited
UNITED STATES PATENTS

| | | | |
|---|---|---|---|
| 3,094,641 | 6/1963 | Gungle et al. | 313/109 |
| 3,115,309 | 12/1963 | Spencer et al. | 313/109 |
| 3,377,494 | 4/1968 | Repsher | 313/109 |
| 3,379,917 | 4/1968 | Menelly | 313/488 |
| 3,599,029 | 8/1971 | Martyny | 313/109 |
| 3,734,817 | 5/1973 | Bienert et al. | 117/124 A |

Primary Examiner—Ronald L. Wibert
Assistant Examiner—Richard A. Rosenberger
Attorney, Agent, or Firm—Norman C. Fulmer; Lawrence R. Kempton; Frank L. Neuhauser

[57] ABSTRACT

A fluorescent lamp having a two-layer precoat on the inner glass bulb surface comprising a layer of titanium dioxide adherent to the glass, and a layer thereover comprising aluminum oxide and either or both of antimony oxide and boron oxide. The phosphor coating is adhered to the precoat inner surface. In a method of making the lamp, the constituents of both layers of the precoat are mixed together and applied simultaneously to the inner bulb surface, the phosphor is applied onto the precoat, and the entire combination is lehred, resulting in formation of the two-layer precoat between the phosphor and the bulb inner surface. The precoat improves phosphor adherence and increases the lumen maintenance of the lamp.

6 Claims, 3 Drawing Figures

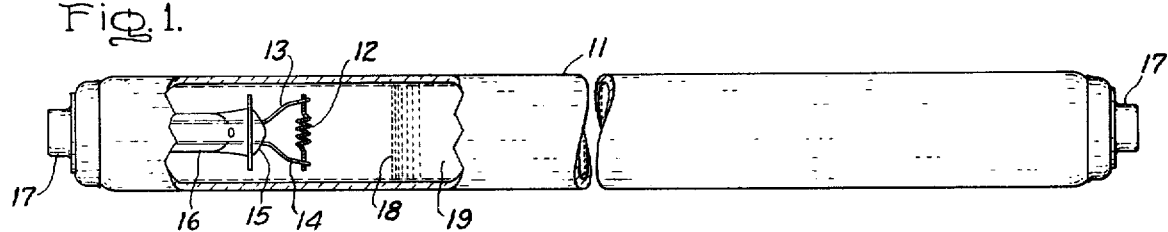
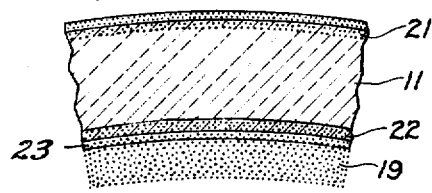
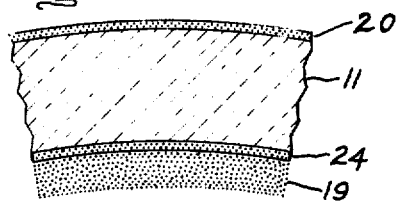

PRECOAT FOR FLUORESCENT LAMP

CROSS-REFERENCE TO RELATED APPLICATION

Ser. No. 325,431 now U.S. Pat. No. 3,847,643, Edward E. Hammer and William C. Martyny, "Improved Surface Treatment of Fluorescent Lamp Bulbs and Other Glass Objects," filed concurrently herewith and assigned the same as this invention.

BACKGROUND OF THE INVENTION

The invention is in the field of protective coatings in lamp bulbs, and is particularly directed to a protective coating or "precoat" between the phosphor and the inner glass bulb surface in a fluorescent lamp.

Various different precoats have been proposed and used for purposes of acting as a barrier to prevent alkali in the glass bulb from reacting with mercury in a mercury discharge lamp (such as a fluorescent lamp), and to prevent the formation of oxide rings in the bulb in the vicinity of the cathodes.

U.S. Pat. No. 3,599,029 to William Martyny, "Fluorescent Lamp Envelope with Transparent Protective Coating" and assigned the same as this invention, is directed to an advantageous two-layer precoat useful in fluorescent lamps and comprising a layer of titanium dioxide ($TiO_2$) on the inner glass bulb surface and a layer of aluminum oxide ($Al_2O_3$) thereover. The phosphor coating is adhered to the precoat inner surface. The precoat can be formed on the bulb by applying a mixture of the constituents of both precoat layers to the inner bulb surface, applying the phosphor onto the precoat, and lehring. This causes the two-layer precoat to form between the phosphor and the inner bulb surface.

SUMMARY OF THE INVENTION

A principal object of the invention is to provide an improved protective coating or precoat for lamp bulbs, and which is particularly suitable for use in fluorescent lamps or other low pressure mercury-vapor lamps.

The invention comprises, briefly and in a preferred embodiment, a lamp having a two-layer precoat on the interior surface of the glass bulb thereof and comprising a layer of titanium dioxide adherent to the glass, and a layer thereover comprising aluminum oxide and either or both of antimony oxide and boron oxide. If the lamp is a fluorescent lamp, the phosphor is adhered to the precoat inner surface. In a method of making the lamp, the constituents of both layers of the precoat are mixed together and applied simultaneously to the inner bulb surface, the phosphor is applied onto the precoat, and the entire combination is lehred resulting in formation of the two-layer precoat between the phosphor and the bulb inner surface.

DESCRIPTION OF THE DRAWING

FIG. 1 shows an embodiment of a lamp made according to this invention,

FIG. 2 shows a cross section through the middle of the lamp, and

FIG. 3 shows a cross section, similar to FIG. 2, at an intermediate step of the process.

DESCRIPTION OF THE PREFERRED EMBODIMENTS

In FIG. 1, the sealed envelope or bulb 11 comprises an elongated soda-lime glass tube of circular cross section. It has the usual cathode electrode 12 at each end supported on inlead wires 13, 14 which extend through a glass press 15 in a mount stem 16, to the contacts of a base 17 affixed to the end of the lamp. The sealed tube is filled with an inert gas such as argon or a mixture of argon and neon at a low pressure, for example 2 millimeters, and a small quantity of mercury, at least enough to provide a pressure of about 6 microns during operation. Numeral 18 designates an undesirable oxide ring that tends to form inside the lamp, and numeral 19 designates the phosphor coating inside the bulb. As best seen in FIG. 2, showing a section through the envelope, to the inner surface of the glass bulb there is applied a protective coating or precoat comprising a thin clear layer 22 consisting essentially of titanium dioxide, which is strongly adherent to the glass, and thereover a thicker layer 23 consisting essentially of aluminum oxide and either or both of antimony oxide and boron oxide. Deposited over the protective coating is the phosphor coating 19 which may consist for example of calcium halophosphate activated with antimony and manganese or any other suitable fluorescent lamp phosphor. The thicknesses of the various layers or coatings are much exaggerated relative to the glass in the drawing.

The composite coating of the invention can be laid down in steps, that is, first the $TiO_2$ layer and then the $Al_2O_3$ layer. However, a valuable feature of the process is that both layers can be laid down simultaneously in a single operation. This is done by flowing onto the glass bulb a mixture comprising the organic titanate in solution and the aluminum oxide combined with either or both of antimony oxide and boron oxide as a suspension in a lacquer, applying the phosphor, and lehring. No additional lehring is involved, as a single lehring after application of the phosphor suffices.

While the layer adhering directly to the glass consists essentially of titania, it may include a minor proportion of alumina and either or both or antimony oxide and boron oxide. The proportion will depend upon the method of preparation, being greater, for instance as much as 10%, where the preferred process is used in which both layers are laid down simultaneously in a single operation. Also the alumina, etc., layer may contain a minor proportion of titania, for instance 1%, and here again the percentage will depend upon the conditions of preparation. These minor occlusions or admixtures in each layer of the substance of the other layer do not reduce the effectiveness of the composite film.

A preferred process for applying the composite coating in accordance with the invention is as follows: (1) a solution is prepared by mixing 30 ml of tetrabutyl titanate into 1000 ml of thinner consisting of 50% butyl acetate and 50% naphtha; (2) a stable dispersion is obtained by placing 125 grams of aluminum oxide, ½ gram of antimony oxide, and/or ½ gram of boron oxide in a pebble mill with 2500 ml of ethyl cellulose binder and milling for 150 hours. Ethyl cellulose binder consists of about 2.5% by weight ethyl cellulose in a thinner consisting of equal parts butyl acetate and naphtha; (3) 200 ml of the aluminum oxide combination from (2) is mixed with the tetrabutyl titanate solution from (1) to form a stable suspension; (4) the suspension from (3) is flushed through an open-ended glass bulb or tube preferably by drawing it up into the tube supported vertically and then allowing it to drain out and dry; (5) using a water soluble binder system, the phosphor coating is applied over the protective barrier coating. As shown in FIG. 3, at this stage the inner surface of the bulb 11 is coated by the suspension 24 which in turn is coated by the phosphor 19; (6) the coated bulb is lehred in the usual manner. This sole lehring wherein the glass tube is baked in a temperature of 550° to 600°C, just below the deformation temperature of the glass serves to make the titanium dioxide shrink into a film 22 on the glass, and also drives the binder out of the alumina, etc., layer to form the layer 23, and also drives the binder out of the phosphor coat, and thus completes preparation of the bulb. The bulb is then completed into an electric lamp envelope by sealing electrode mounts into the ends and processing to a complete lamp in the usual way.

Other organic titanate compounds which hydrolize to $TiO_2$ and the corresponding alcohol may be used in lieu of tetrabutyl titanate, for instance isopropyl titanate.

In the composite coating of the invention, the titanium dioxide forms a continuous layer on the glass which is tightly adherent and cannot be wiped or brushed off. This titanium dioxide film is substantially continuous, and individual particles cannot be distinguished by an optical microscope or under X rays. The adherence of the layer of aluminum oxide, antimony oxide and boron oxide, which consists of individual particles, is improved by the presence of the titanium dioxide layer. The result is that the aluminum oxide, etc., layer in the composite coating is much more adherent and can only be wiped off with considerable difficulty and appreciable pressure. This means that flaking off is much reduced and adhesion of the phosphor, which depends upon the adhesion of the alumina layer, is likewise improved. Also, the lamp's lumens maintenance is improved.

The titanium dioxide layer is in the range of 0.005 to 0.01 microns thick and, due to its reflectivity, cuts down the transmission of light from a fluorescent lamp by about 3%. When, in accordance with the invention this layer is combined with the aluminum oxide, etc., layer which is in the range of 2 to 5 microns thick, the transmission is restored to normal, that is, it is about the same as if no coating were present.

The exterior surface of the bulb may be hardened and strengthened by the method of the above-identified patent application. To achieve this, prior to the step of lehring, a coating 20 (FIG. 3) is applied to the exterior of the bulb. The coating 20 comprises a solution of aluminum-s-butoxide, tetrabutyl titanate, and either or both of tri-n-butyl antimonite and tri-n-butyl borate.

During the subsequent step of lehring, the material of the coating 20 reacts with, and partly penetrates into, the glass surface as indicated by numeral 21 in FIG. 2. This treatment not only hardens and strengthens the outer glass surface, but also increases its lubricity thereby facilitating handling of the bulb by automatic production machinery.

While preferred embodiments of the invention have been shown and described, various other embodiments and modifications thereof will become apparent to persons skilled in the art, and will fall within the scope of the invention as defined in the following claims.

What we claim as new and desire to secure by Letters Patent of the United States is:

1. A mercury-vapor discharge lamp comprising a sealed glass envelope having electrodes sealed therein, and a composite protective barrier coating adhering to the inner surface of said envelope, said coating comprising a first layer consisting essentially of titanium dioxide coated on an adhering to the inner surface of said envelope and a second layer consisting essentially of aluminum oxide and antimony oxide over said titanium dioxide layer, and a phosphor coating over said second layer of the protective coating.

2. A lamp as in claim 1 wherein the first layer is from 0.005 to 0.01 microns thick and the second layer is from 2 to 5 microns thick.

3. A glass lamp bulb having a composite protective coating adhering to its inner surface, said coating comprising a first layer consisting essentially of titanium dioxide coated on and adhering to the inner surface of said bulb and a second layer consisting essentially of aluminum oxide and antimony oxide over said titanium dioxide layer, and a phosphor coating over said second layer of the protective coating.

4. A lamp bulb as in claim 3 wherein the first layer is from 0.005 to 0.01 microns thick and the second layer is from 2 to 5 microns thick.

5. The method of treating a glass lamp envelope comprising the steps of making a solution of an organotitanate in an organic solvent, making a suspension of aluminum oxide and antimony oxide in an organic binder, mixing said solution and said suspension together, applying a coating of the mixture over the inner surface of the glass envelope, drying in air, applying a phosphor coating over said mixture coating, and lehring.

6. The method of claim 5 wherein the organotitanate is tetrabutyl titanate.

* * * * *